(12) United States Patent
Liao

(10) Patent No.: US 11,359,664 B2
(45) Date of Patent: Jun. 14, 2022

(54) SUCTION CUP

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

(*) Notice: Subject to any disclaimer, the term of this patent is extended or adjusted under 35 U.S.C. 154(b) by 249 days.

(21) Appl. No.: 16/734,974

(22) Filed: Jan. 6, 2020

(65) Prior Publication Data
US 2021/0207647 A1 Jul. 8, 2021

(51) Int. Cl.
*F16B 47/00* (2006.01)
*B65G 47/91* (2006.01)
*B65G 49/06* (2006.01)

(52) U.S. Cl.
CPC ............. *F16B 47/00* (2013.01); *B65G 47/91* (2013.01); *B65G 49/061* (2013.01)

(58) Field of Classification Search
CPC ........ F16B 47/00; F16B 1/0057; B65G 47/91; B65G 49/061; B65G 2249/045; B25B 11/007
USPC ... 248/467, 537, 205.5, 205.8, 206.2, 206.3, 248/309.4, 362, 363
See application file for complete search history.

(56) References Cited

U.S. PATENT DOCUMENTS

| | | | | | |
|---|---|---|---|---|---|
| 2,049,872 | A | * | 8/1936 | Shinichi | B65B 31/04 92/110 |
| 3,347,327 | A | * | 10/1967 | Gunter | B65G 47/91 177/208 |
| 3,593,983 | A | * | 7/1971 | Csenyi | H05K 13/089 269/21 |
| 3,785,691 | A | * | 1/1974 | Sperry | B66C 1/0293 294/186 |
| 6,431,624 | B1 | * | 8/2002 | Dunger | B25J 15/0616 294/186 |
| 7,124,987 | B2 | * | 10/2006 | Zschiedrich | F16B 47/00 248/205.9 |
| 9,669,442 | B1 | * | 6/2017 | Alvarez | B21D 1/06 |
| 2002/0175527 | A1 | * | 11/2002 | Huang | B25B 11/007 294/187 |
| 2009/0175747 | A1 | * | 7/2009 | LeBoeuf | F04B 33/00 417/545 |
| 2015/0377280 | A1 | * | 12/2015 | Pötters | A47G 1/17 248/205.9 |
| 2016/0108954 | A1 | * | 4/2016 | Chen | F16M 13/022 248/205.8 |
| 2017/0333643 | A1 | * | 11/2017 | Taylor | A61M 1/81 |
| 2021/0324841 | A1 | * | 10/2021 | Schmidt | F16B 47/00 |

FOREIGN PATENT DOCUMENTS

TW M288662 U 3/2006

* cited by examiner

*Primary Examiner* — Muhammad Ijaz
(74) *Attorney, Agent, or Firm* — Muncy, Geissler, Olds & Lowe, P.C.

(57) ABSTRACT

A suction cup is provided, including: a cup body, including a sucking face, the cup body defining an axial direction perpendicular to the sucking face; a pump, connected to an end of the cup body opposite to the sucking face, the pump including a first passageway, a direction in which the first passageway extends and the axial direction forming an included angle therebetween; a movable handle, slidably disposed within the first passageway, including a piston.

6 Claims, 8 Drawing Sheets

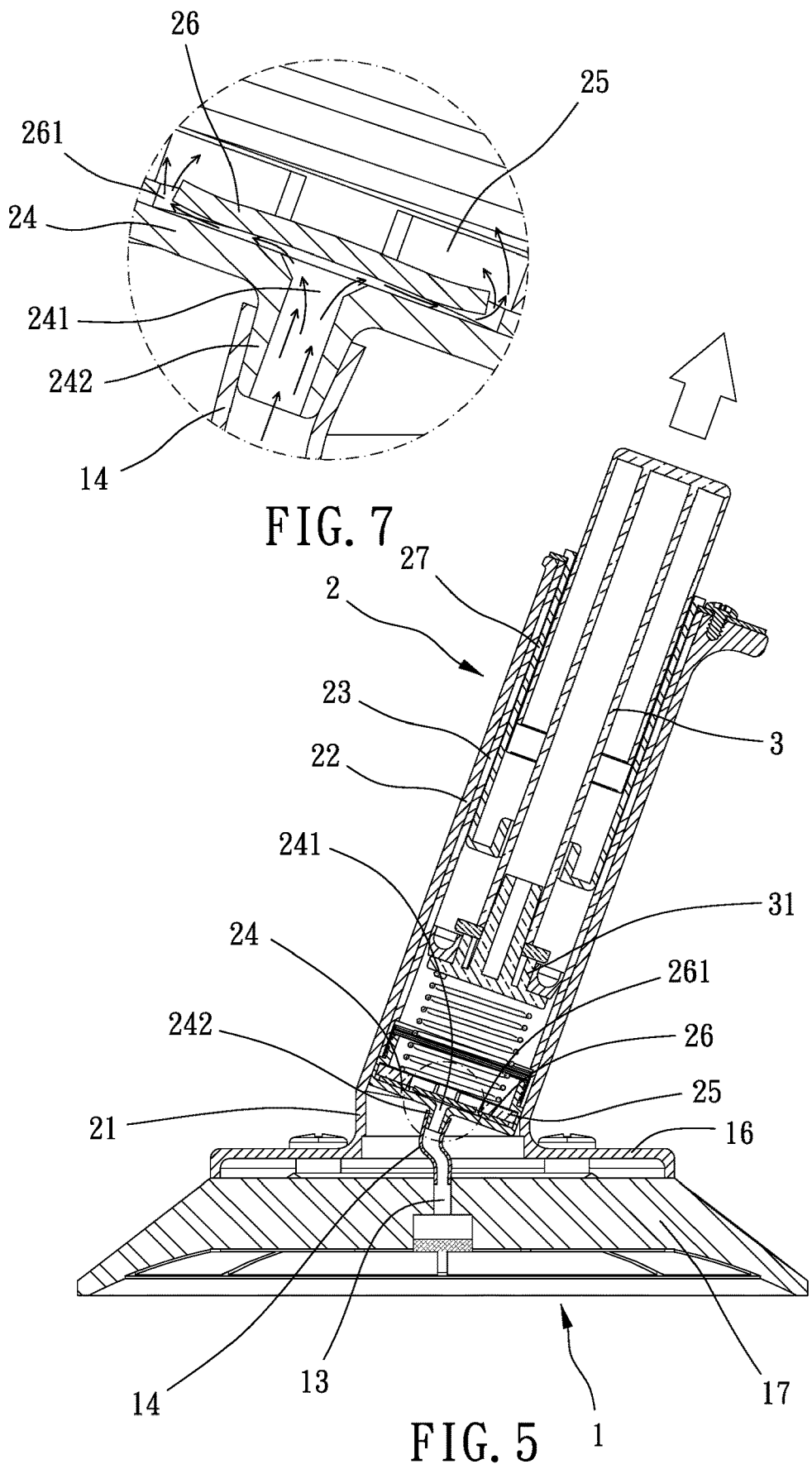

SUCTION CUP

BACKGROUND OF THE INVENTION

Field of the Invention

The present invention relates to a suction cup.

Description of the Prior Art

An object such as glass or slate has a large size and a smooth surface, and is fragile, which is hard to be moved and transported. Therefore, a suction cup, such as one that disclosed in TWM288662, is provided to suck the object which has a large size and a smooth surface and is fragile, which can effectively improve the movement and transportation of the object.

However, for mounting/dismounting an object, such as a windshield of a vehicle, which is not horizontal, the user has to grip the handle of the suction cup with his waists flexing downwardly, which can cause wrist sprain easily; otherwise, for avoiding wrist sprain, the user should slightly squat or flex his waist or legs to have a lower position in compliance with the height of the vehicle, which can cause injury to waist or legs.

The present invention is, therefore, arisen to obviate or at least mitigate the above-mentioned disadvantages.

SUMMARY OF THE INVENTION

The main object of the present invention is to provide a suction cup with which it is convenient and effective to mount or dismount the windshield without causing harm to the hand(s) knees and/or waist.

To achieve the above and other objects, the present invention provides a suction cup, including: a cup body, including a sucking face, the cup body defining an axial direction perpendicular to the sucking face; a pump, connected to an end of the cup body opposite to the sucking face, the pump including a first passageway, a direction in which the first passageway extends and the axial direction forming an included angle therebetween; a movable handle, slidably disposed within the first passageway, including a piston.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIGS. 4 and 5 are cross-sectional views showing operation according to a preferable embodiment of the present invention;

FIG. 6 is a partial enlargement of FIG. 4;

FIG. 7 is a partial enlargement of FIG. 5;

DETAILED DESCRIPTION OF THE PREFERRED EMBODIMENTS

Figure 1:
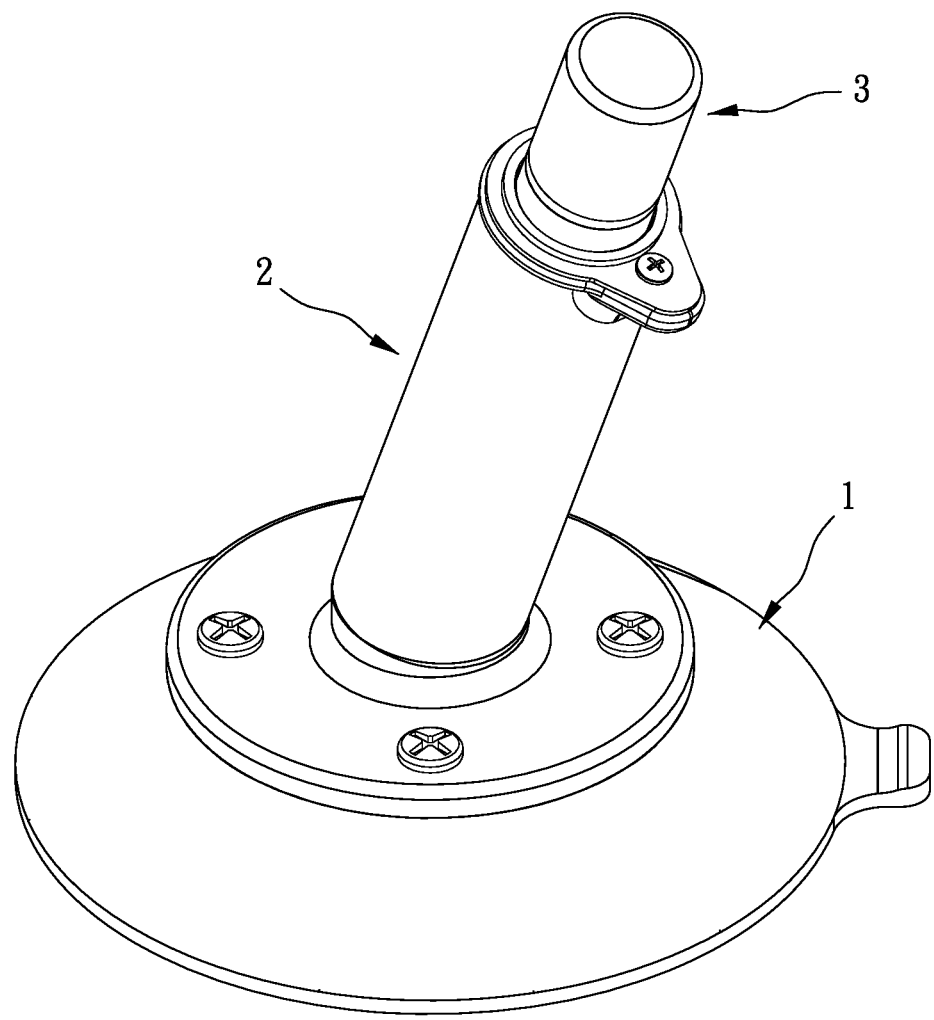
FIG. 1 is a stereogram of a preferable embodiment of the present invention.
Figure 2:
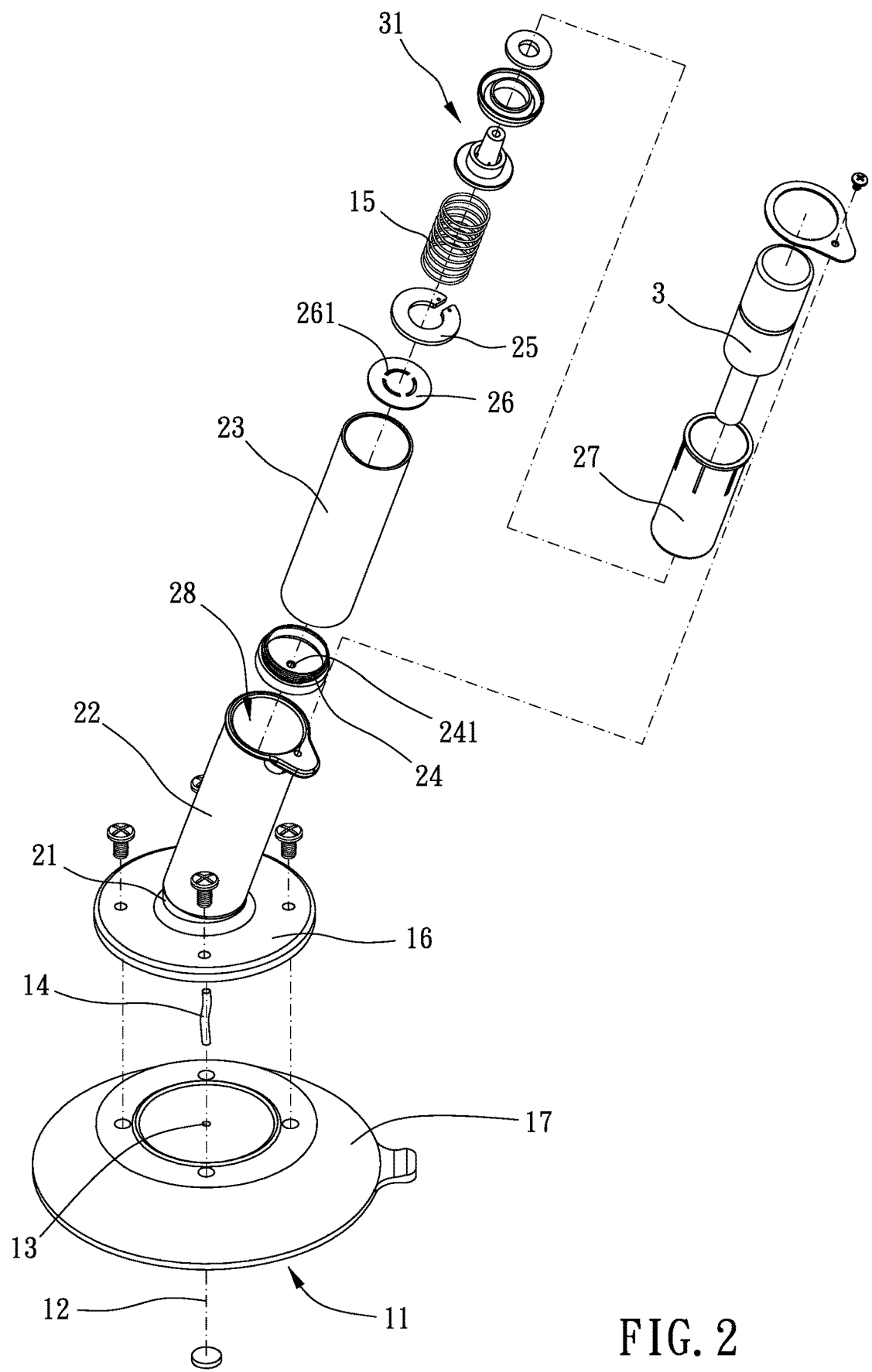
FIG. 2 is a breakdown drawing of a preferable embodiment of the present invention.

Please refer to FIGS. 1 to 10 for a preferable embodiment of the present invention. A suction cup of the present invention includes a cup body 1, a pump 2 and a movable handle 3.

The cup body 1 includes a sucking face 11 configured to suck an object (such as glass plate or the like), and the cup body 1 defines an axial direction 12 perpendicular to the sucking face 11.

Figure 3:
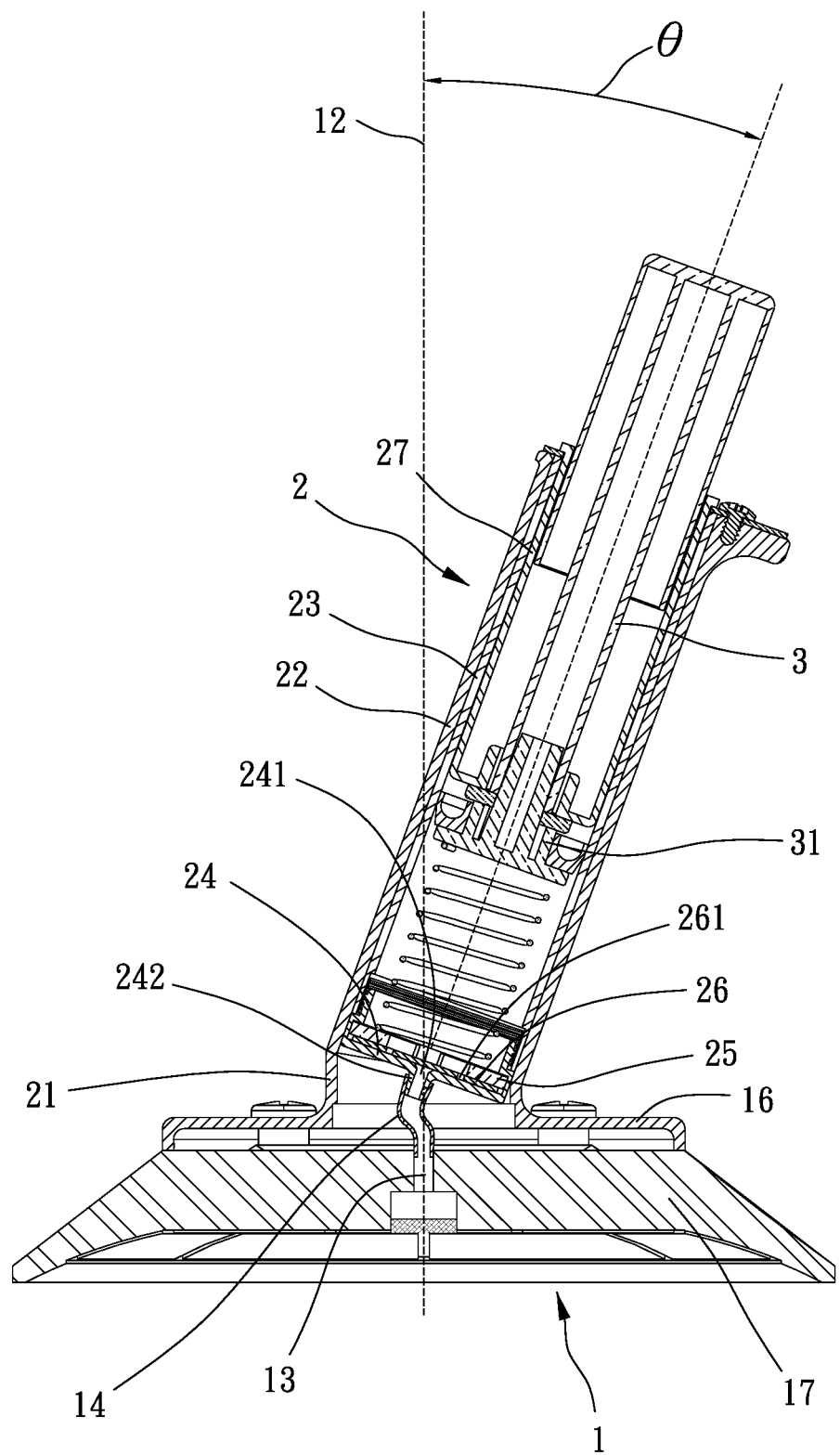
FIG. 3 is a side cross-sectional view of a preferable embodiment of the present invention.
Figures 4, 6:
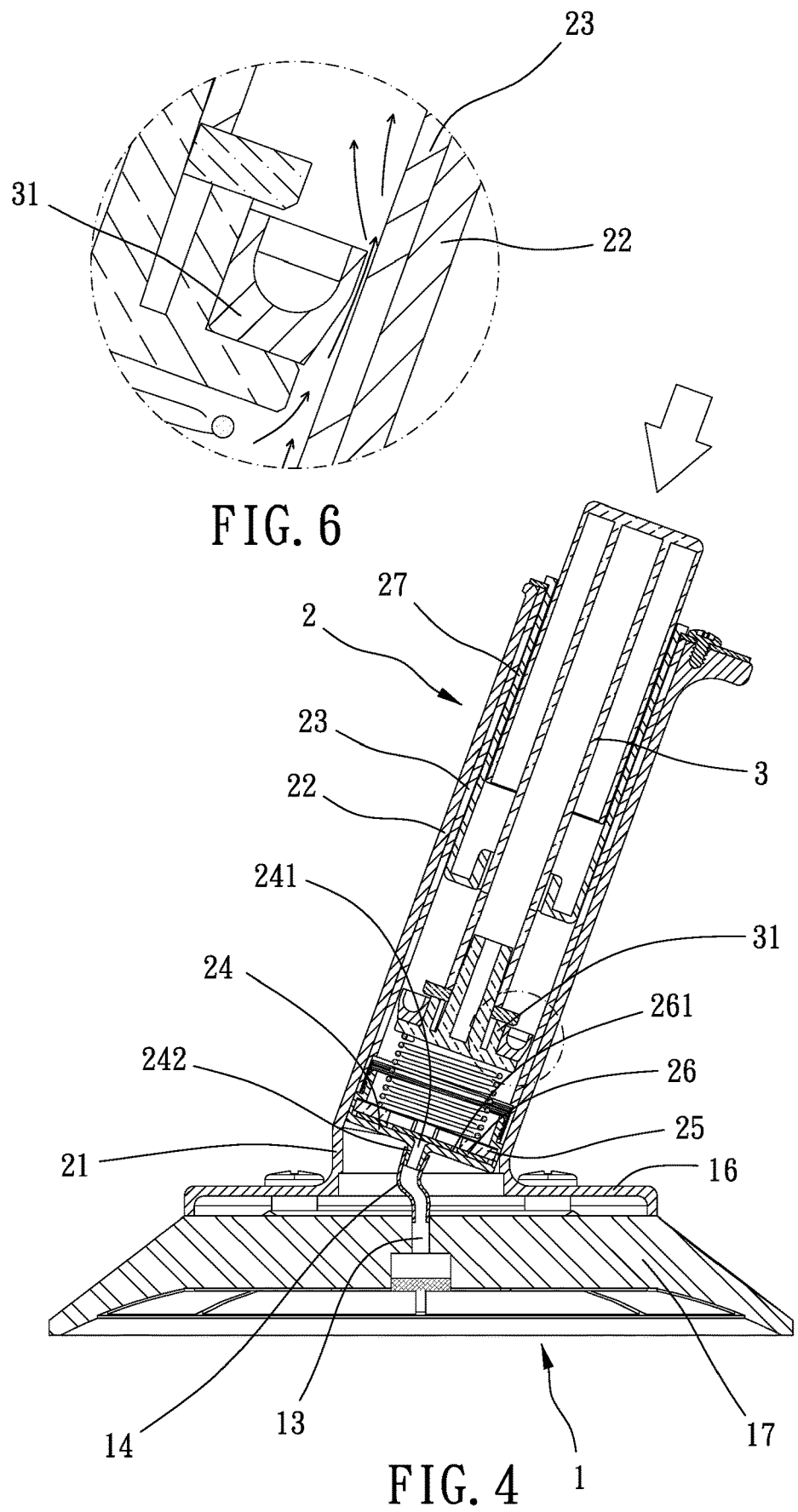
Figure 8:
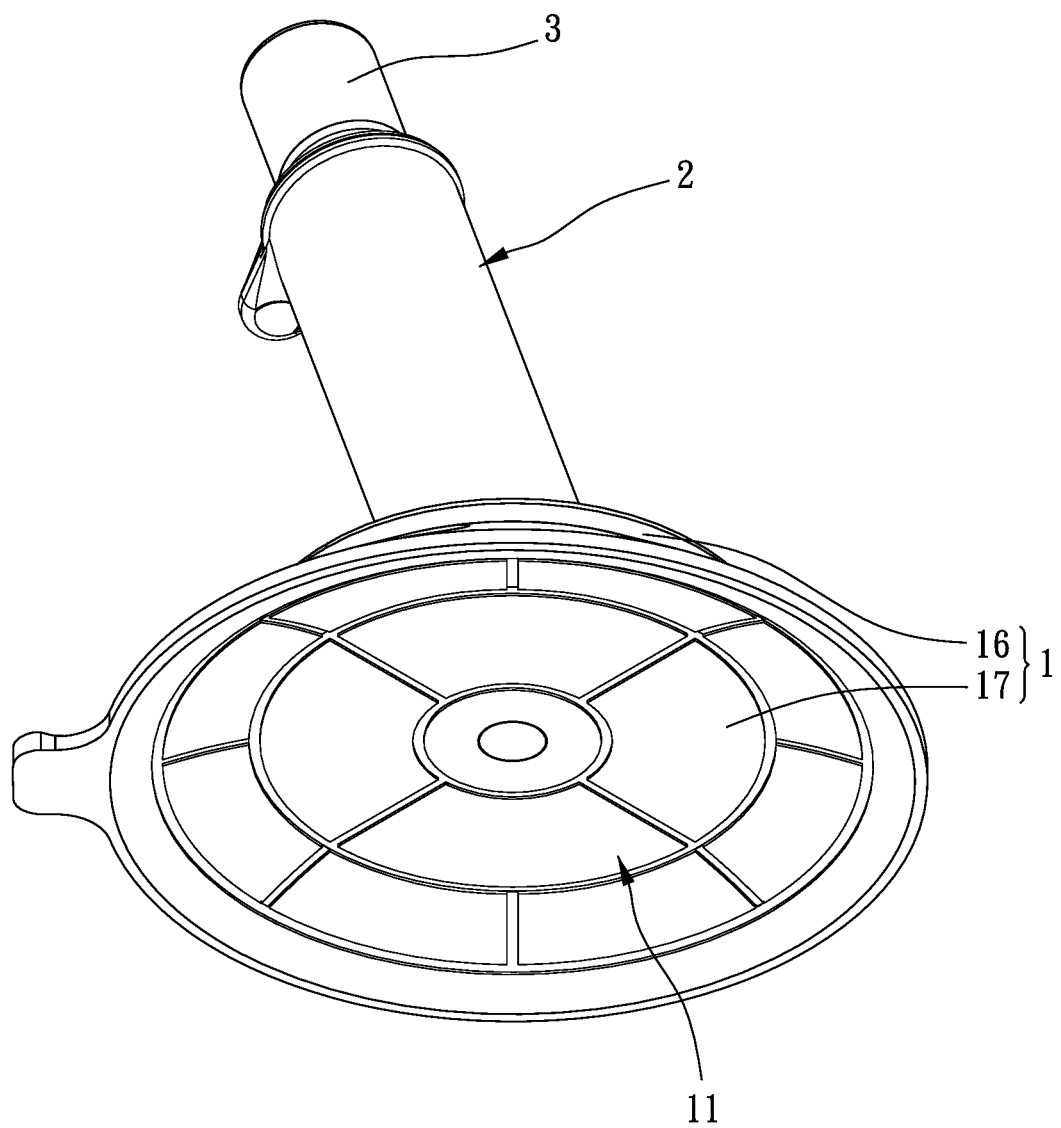
FIG. 8 is another stereogram of a preferable embodiment of the present invention.

The pump 2 is connected to an end of the cup body 1 opposite to the sucking face 11, the pump 2 includes a first passageway 28, a direction in which the first passageway 28 extends and the axial direction 12 form an included angle θ (FIG. 3). That is, the pump 2 and the axial direction 12 are arranged with the included angle θ therebetween.

The movable handle 3 is slidably disposed within the first passageway 28 and includes a piston 31 configured to vent gas between the sucking face 11 and the object for sucking the object.

Figure 9:
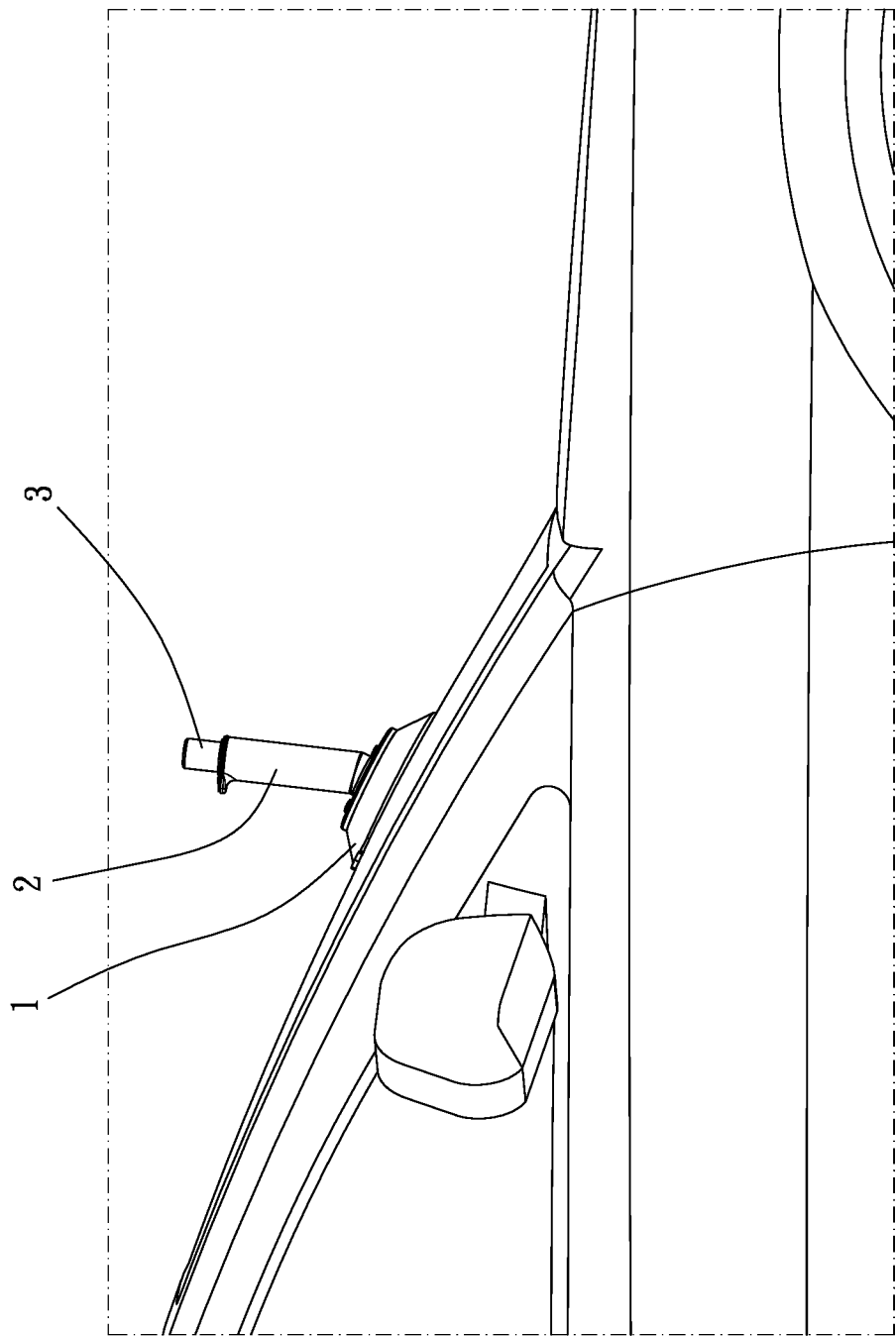
FIGS. 9 and 10 are drawings showing an application of the present invention.
Figure 10:
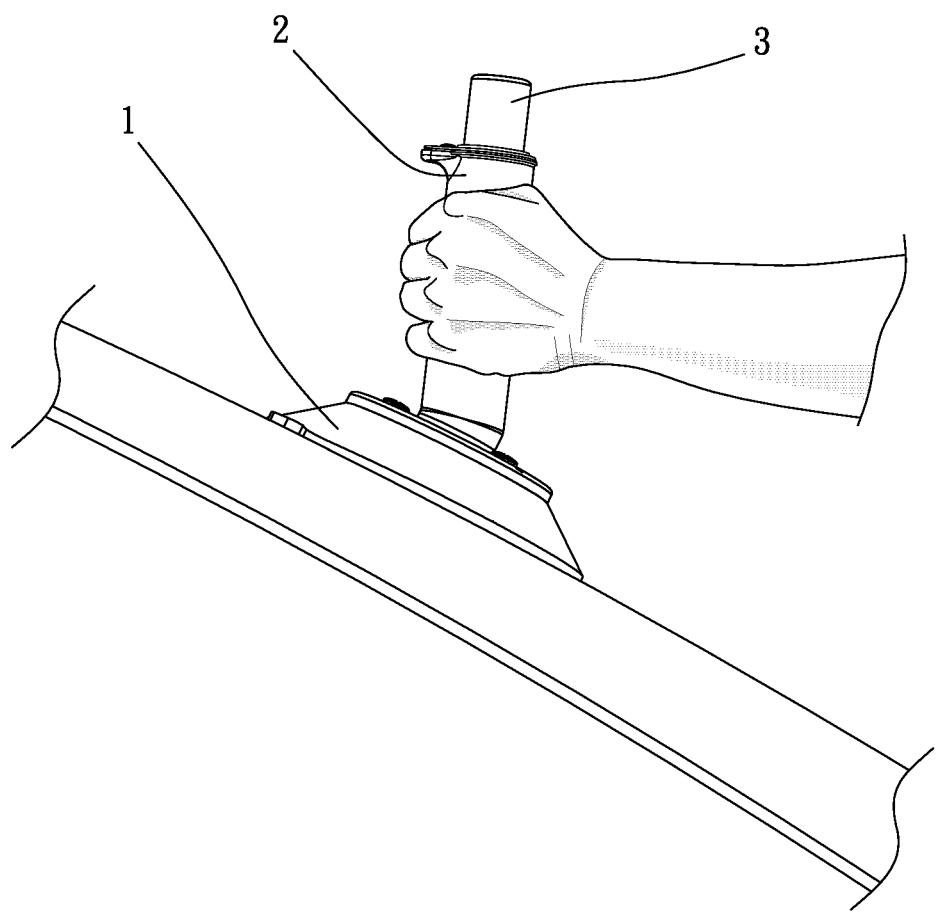

Preferably, the included angle θ is between 10 degrees to 30 degrees. In this embodiment, the included angle θ is 20 degrees. Specifically, as shown in FIGS. 9 and 10, the object is a windshield of a vehicle. When the suction cup sucks on the windshield, the operator can grip the pump 2 with his hand(s) horizontally without flexing legs and/or waist, thus being convenient and effective to mount or dismount the windshield without causing harm to the hand(s) knees and/or waist.

Specifically, an arcuate section 21 is connected between the cup body 1 and the pump 2, so the pump 2 and the axial direction 12 can be provided with the included angle θ therebetween.

The pump 2 further includes an outer tubular member 22 and an inner tubular member 23 which are fixedly connected with each other. The outer tubular member 22 is connected to the arcuate section 21, and the movable handle 3 is slidably disposed within the inner tubular member 23. The cup body 1 further includes a round plate 16 and a flexible disc 17, the sucking face 11 is disposed on a side of the flexible disc 17 opposite to the round plate 16. The round plate 16, the arcuate section 21 and the outer tubular member 22 are formed of one piece; however, the round plate 16, the arcuate section 21 and the outer tubular member 22 may be welded or detachably assembled.

Preferably, a cap member 24 is disposed at an end of the inner tubular member 23 directed toward the cup body 1, the cap member 24 includes a through hole 241, the cup body 1 further includes a second passageway 13 which is through the cup body 1 side to side, and the through hole 241 is communicated with the second passageway 13. The cap member 24 is preferably screwed with the inner tubular member 23, thus being easy to assemble/disassemble and providing good sealing.

The cup body 1 further includes a nozzle 242 including the through hole 241, and a connecting tube 14 is communicated with and between the nozzle 242 and the second passageway 13. Preferably, the connecting tube 14 is flexible, which can be smoothly connected between the nozzle 242 and the second passageway 13.

A ring member 25 and a valve sheet 26 are disposed by a side of the cap member 24 opposite to the cup body 1, the valve sheet 26 is abutted between the ring member 25 and the cap member 24, the valve sheet 26 includes a plurality of slits 261 arranged circumferentially, and the through hole 241 centrally corresponds to the plurality of slits 261. When the piston 31 moves in a direction away from the cup body 1, the valve sheet 26 is drawn to lift so that gas can flow, via the through hole 241, into the inner tubular member 23 (FIG. 7); when the piston 31 moves toward the cup body 1, the valve sheet 26 blocks the through hole 241 so that gas cannot flow through the through hole 241.

In this embodiment, an elastic member 15, the elastic member 15 is disposed between the cap member 24 and the piston 31 and configured to bias the piston 31 and the movable handle 3 in a direction away from the cup body 1, for quick resiliently reciprocative operation of the movable handle 3.

The pump 2 further includes a sleeve member 27 non-movably inserted into the inner tubular member 23, and the movable handle 3 is slidably disposed through the sleeve member 27. The sleeve member 27 can stop the piston 31 so as to prevent the movable handle 3 form detaching the pump 2, and the sleeve member 27 can avoid abrasion of the movable handle 3 and the inner tubular member 23.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A suction cup, including:
   a cup body, including a sucking face, the cup body defining an axial direction perpendicular to the sucking face;
   a pump, connected to an end of the cup body opposite to the sucking face, the pump including a first passageway, a direction in which the first passageway extends and the axial direction forming an included angle therebetween, the included angle being less than 90 degrees;
   a movable handle, slidably disposed within the first passageway, including a piston;
   wherein an arcuate section is connected between the cup body and the pump;
   wherein the pump further includes an outer tubular member and an inner tubular member which are fixedly connected with each other, the outer tubular member is connected to the arcuate section, and the movable handle is slidably disposed within the inner tubular member;
   wherein a cap member is disposed at an end of the inner tubular member directed toward the cup body, the cap member includes a through hole, the cup body further includes a second passageway which is through the cup body side to side, and the through hole is communicated with the second passageway;
   wherein the cup body further includes a nozzle including the through hole, and a connecting tube is communicated with and between the nozzle the second passageway.

2. The suction cup of claim 1, wherein the pump further includes a sleeve member non-movably inserted into the inner tubular member, and the movable handle is slidably disposed through the sleeve member.

3. The suction cup of claim 1, wherein the included angle is between 10 degrees to 30 degrees.

4. A suction cup, including:
   a cup body, including a sucking face, the cup body defining an axial direction perpendicular to the sucking face;
   a pump, connected to an end of the cup body opposite to the sucking face, the pump including a first passageway, a direction in which the first passageway extends and the axial direction forming an included angle therebetween, the included angle being less than 90 degrees;
   a movable handle, slidably disposed within the first passageway, including a piston;
   wherein an arcuate section is connected between the cup body and the pump;
   wherein the pump further includes an outer tubular member and an inner tubular member which are fixedly connected with each other, the outer tubular member is connected to the arcuate section, and the movable handle is slidably disposed within the inner tubular member;
   wherein a cap member is disposed at an end of the inner tubular member directed toward the cup body, the cap member includes a through hole, the cup body further includes a second passageway which is through the cup body side to side, and the through hole is communicated with the second passageway;
   wherein a ring member and a valve sheet are disposed by a side of the cap member opposite to the cup body, the valve sheet is abutted between the ring member and the cap member, the valve sheet includes a plurality of slits arranged circumferentially, and the through hole centrally corresponds to the plurality of slits.

5. A suction cup, including:
   a cup body, including a sucking face, the cup body defining an axial direction perpendicular to the sucking face;
   a pump, connected to an end of the cup body opposite to the sucking face, the pump including a first passageway, a direction in which the first passageway extends and the axial direction forming an included angle therebetween, the included angle being less than 90 degrees;
   a movable handle, slidably disposed within the first passageway, including a piston;
   wherein an arcuate section is connected between the cup body and the pump;
   wherein the pump further includes an outer tubular member and an inner tubular member which are fixedly connected with each other, the outer tubular member is connected to the arcuate section, and the movable handle is slidably disposed within the inner tubular member;
   wherein a cap member is disposed at an end of the inner tubular member directed toward the cup body, the cap member includes a through hole, the cup body further includes a second passageway which is through the cup body side to side, and the through hole is communicated with the second passageway;
   wherein an elastic member is disposed between the cap member and the piston and configured to bias the piston and the movable handle in a direction away from the cup body.

6. The suction cup of claim 1, wherein a ring member and a valve sheet are disposed by a side of the cap member opposite to the cup body, the valve sheet is abutted between the ring member and the cap member, the valve sheet includes a plurality of slits arranged circumferentially, and the through hole centrally corresponds to the plurality of slits; an elastic member is disposed between the cap member and the piston and configured to bias the piston and the movable handle in a direction away from the cup body; the pump further includes a sleeve member non-movably inserted into the inner tubular member, and the movable handle is slidably disposed through the sleeve member; the included angle is 20 degrees; the connecting tube is flexible; the cup body includes a round plate and a flexible disc, the sucking face is disposed on a side of the flexible disc opposite to the round plate, the round plate, the arcuate section and the outer tubular member are formed of one piece; and the cap member is screwed with the inner tubular member.

* * * * *